(12) United States Patent
Chen et al.

(10) Patent No.: US 11,089,463 B2
(45) Date of Patent: Aug. 10, 2021

(54) METHOD AND DEVICE FOR ACTIVATING NEAR FIELD COMMUNICATION CARD

(71) Applicant: BEIJING XIAOMI MOBILE SOFTWARE CO., LTD., Beijing (CN)

(72) Inventors: Shan Chen, Beijing (CN); Mengshan Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/741,852

(22) Filed: Jan. 14, 2020

(65) Prior Publication Data
US 2021/0099851 A1 Apr. 1, 2021

(30) Foreign Application Priority Data
Sep. 29, 2019 (CN) .......................... 201910933822.8

(51) Int. Cl.
*H04M 3/00* (2006.01)
*H04W 4/80* (2018.01)
*H04W 88/02* (2009.01)

(52) U.S. Cl.
CPC .............. *H04W 4/80* (2018.02); *H04W 88/02* (2013.01)

(58) Field of Classification Search
CPC ....... H04W 84/18; H04W 12/06; H04W 8/24; H04W 8/183; H04W 8/245; H04W 76/02; H04W 24/02; H04W 88/02; H04W 88/06; H04W 4/80; H04M 1/72525; H04M 1/72522; H04M 1/7523; H04M 2250/02; H04M 2250/14
USPC ............................... 455/418, 41.1, 41.2, 558
See application file for complete search history.

(56) References Cited

U.S. PATENT DOCUMENTS

| | | | |
|---|---|---|---|
| 10,108,827 B1 | 10/2018 | Wurmfeld et al. | |
| 2015/0261984 A1 | 9/2015 | Cho et al. | |
| 2016/0241999 A1* | 8/2016 | Chin | G08C 23/04 |
| 2018/0109291 A1* | 4/2018 | Peng | H04B 5/00 |
| 2019/0147203 A1 | 5/2019 | Wurmfeld et al. | |
| 2019/0332830 A1 | 10/2019 | Wurmfeld et al. | |
| 2020/0074773 A1* | 3/2020 | Hogg | G06K 7/10366 |
| 2020/0097083 A1* | 3/2020 | Mao | G06F 3/017 |
| 2020/0162875 A1* | 5/2020 | Gabriele | G06Q 20/40155 |
| 2020/0297063 A1* | 9/2020 | Andon | G06F 3/016 |
| 2020/0349328 A1* | 11/2020 | Espinosa | G06K 19/0717 |

FOREIGN PATENT DOCUMENTS

CN 109257071 A 1/2019

OTHER PUBLICATIONS

European Search Report in the European application No. 20153328.8, dated Mar. 30, 2020.

* cited by examiner

*Primary Examiner* — Temica M Beamer
(74) *Attorney, Agent, or Firm* — Syncoda LLC; Feng Ma

(57) ABSTRACT

A method and device for activating a Near Field Communication (NFC) can improve efficiency in management of switching a simulation card. The method can include: a default action of at least one associated device is detected; in response to that a default action of the at least one associated device is detected, an NFC card associated with the default action of the at least one associated device in a local device is activated. A terminal integrated with an NFC function can implement automatic selection and activation of an NFC card.

14 Claims, 9 Drawing Sheets

METHOD AND DEVICE FOR ACTIVATING NEAR FIELD COMMUNICATION CARD

CROSS-REFERENCE TO RELATED APPLICATION

The present application claims priority to Chinese Patent Application No. 201910933822.8 filed on Sep. 29, 2019, the disclosure of which is hereby incorporated by reference in its entirety.

SUMMARY

The present disclosure relates to a Near Field Communication (NFC) technology, and more particularly, to a method and device for activating an NFC card.

According a first aspect of embodiments of the present disclosure, a method for activating an NFC card is provided, which may include that:

an action of at least one associated device is detected; and
in response to that a default action of the at least one associated device is detected, an NFC card disposed in a device and associated with the default action of the at least one associated device is activated.

According a second aspect of the embodiments of the present disclosure, a device for activating an NFC card is further provided, which may include:

an associated device detecting module, configured to detect an action of at least one associated device; and
a card activating module, configured to activate, in response to that a default action of the at least one associated device is detected, an NFC card disposed in a device and associated with the default action of the at least one associated device.

According a third aspect of the embodiments of the present disclosure, a computer device is further provided, which may include:

a processor; and
a memory configured to store instructions executable for the processor,
wherein the processor is configured to:
detect an action of at least one associated device; and
in response to that a default action of the at least one associated device is detected, activate an NFC card disposed in a device and associated with the default action of the at least one associated device in the local device.

According a fourth aspect of the embodiments of the present disclosure, a non-transitory computer-readable storage medium is further provided. The instructions in the storage medium, when executed by a processor of a mobile terminal, enable the mobile terminal to execute a method for activating a Near Field Communication (NFC) card. The method may include that:

an action of at least one associated device is detected; and
in response to that a default action of the at least one associated device is detected, an NFC card disposed in a device and associated with the default action of the at least one associated device is activated.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
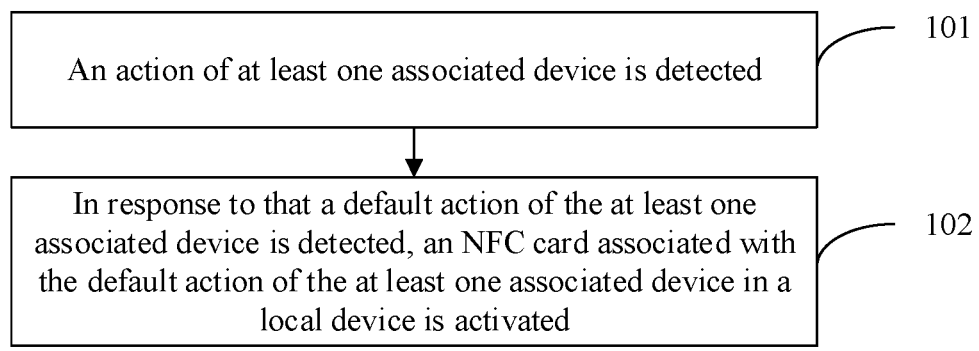
FIG. 1 is a flowchart illustrating a method for activating an NFC card according to some embodiments.

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the embodiments of the present disclosure. Instead, they are merely examples of apparatuses and methods consistent with aspects of the embodiments of the present disclosure as recited in the appended claims.

The terms used in the embodiments of the present disclosure are for the purpose of describing the specific embodiments only, and are not intended to limit the embodiments of the present disclosure. Unless otherwise defined, technical terms or scientific terms used in the embodiments of the present disclosure should be understood in the ordinary meaning of those of ordinary skill in the art to which the invention pertains. The words "first," "second" and similar terms used in the specification and claims of the present disclosure are not intended to indicate any order, quantity or importance, but only to distinguish different components. Similarly, the words "a" or "an" and the like do not denote a quantity limitation, but mean that there is at least one. "Multiple" or "several" means two or more than two. The similar words "including" or "comprising" and the like mean that elements or objects preceding "including" or "comprising" encompass elements or objects listed after "including" or "comprising" and their equivalents, and do not exclude other elements or objects. The similar words "connecting" or "connected" and the like are not limited to physical or mechanical connections, and may include electrical connections, whether direct or indirect. The singular forms "a," "the" and "this" used in the specification of the embodiments of the present disclosure and the appended claims are also intended to include a plurality of forms unless the context clearly indicates otherwise. It should also be understood that the term "and/or" as used herein refers to and encompasses any or all possible combinations of one or more of the associated listed items.

Terminals, such as a smart watch and a mobile phone, are typically provided with a plurality of simulation cards, and the cards may respectively correspond to different application scenarios (such as a bus card, a time card, and an electronic key for door lock). In actual uses, a user needs to activate a simulation card according to a specific application scenario. The card can be activated by the user through a manual operation or by a terminal based on an automatic judgment.

A general process of manually activating an NFC card is as follows:

1) a device is manually woken up;
2) an application for managing a simulation card is started in the device;
3) the application displays a list of simulation cards stored in an NFC chip of the terminal, and a user finds a target card in the list;
4) the user operates the target card to activate it, and the target card is switched to a readable state; and
5) the user waits for successful activation, and then uses the card.

The above manual activation process generally takes ten to tens of seconds and requires a user to carry out multiple operations of manual operations, and thus is complicated.

Activation of an NFC card through an automatic judgment of a terminal often needs to integrate information of a card reading device into a simulation card, such as identity information and geographic location information of the card reading device. When the NFC card is needed to be used, the terminal is taken close to the card reading device like a gate machine able to read the NFC card, and then an application for activation through an automatic judgment can be triggered. The application can make a judgment on the identity information of the gate machine or the real-time geographic location of the terminal, compare such information with the information of the card reading device, and activate the matching simulation card to enter the readable state.

For management of switching and activation of a plurality of NFC cards in the same terminal, manual activation often takes ten to tens of seconds and requires a user to carry out multiple operations of manual operations, and thus is complicated.

For the activation through an automatic judgment, matching and activating the simulation card can be started only after a card enters a working range of a card swiping device (for example, the card contacts with the card swiping device), which may take long time. Since the environment of the card reading device often has limitations, for example, in a case that the card reading device is a subway turnstile, the underground coverage of a mobile signal may be poor, and a GPS signal thus may be weak, so that address location information needed cannot be read in time; in this case, the activation process may be too long or even failed, which degrades the user experience.

As such, both the manual activation and the activation by a terminal through an automatic judgment have a low efficiency and poor user experience.

Various embodiments of the present disclosure provide a method and device for activating an NFC card. At least one associated device can be configured for a terminal, and different NFC cards on the terminal can be triggered, selected and activated according to an action of the at least one associated device, so that a low efficiency in management of switching a simulation card and a poor user experience can be improved.

Some embodiments of the present disclosure provide a method for activating an NFC card. As shown in FIG. 1, the process of switching among a plurality of NFC cards stored in a terminal device through the method may include the following operations.

In operation 101, an action of at least one associated device is detected.

In the present disclosure, the terminal device may be equipped with at least one associated device, and detect the action of each associated device.

The terminal device and the associated device may be in the same local area network. The terminal device may acquire information about the action of the associated device through a gateway. Working states of all devices in a smart home network can be acquired through a gateway and other devices, and information of the associated device can be extracted from the working states, or working state information of the associated device can be directly selected by the gateway and sent to a mobile terminal. The terminal device can also build a temporary or continuous direct connection with the associated device, and directly acquire from the associated device the information about its action.

Taking that the terminal is a wearable device (e.g. a smart watch or a smart bracelet) for example, the wearable device and its own associated device may be smart devices on the same Internet of Things (IoT) platform (e.g. a router, a smart lamp, an air purifier, smart windows and doors, an intelligent refrigerator, an intelligent washing machine, a sweeper, a smart television, or an intelligent air conditioner).

In operation 102, in response to that a default action of the at least one associated device is detected, an NFC card dispose in a device and associated with the default action of the at least one associated device is activated.

In the present disclosure, a plurality of NFC cards may be configured in the terminal device, and the NFC card may be an NFC simulation card.

Each NFC card can be associated with an action of at least one associated device, and may be associated with default actions of a plurality of different associated devices and may also be associated with different default actions of the same associated device.

When a default action of an associated device is detected, it can be determined that an NFC card associated with the default action of the associated device in the terminal device is activated, and thus automatic switching and activation of the NFC card can be completed.

Taking that the terminal is a wearable device for example, the wearable device and the its own associated device may be on the same IoT platform, and intelligent automation can be set in a corresponding platform application, so that the wearable device can interact with an associated intelligent device; that is, a default action of the wearable device can be set as a triggering condition, and upon that the default action occurs, activation of an NFC card associated with the default action of the associated device can be triggered.

The embodiments of the present disclosure provide a method for activating an NFC card, which may include that: an action of at least one associated device is detected, and in response to that a default action of the at least one associated device is detected, an NFC card disposed in the local device and associated with the default action of the at least one associated device is activated. The low efficiency in management of switching a simulation card and the poor user experience can be improved. When network and positioning signals are good, automatic activation can be completed in advance without manually performing any operations, thereby improving the operation efficiency.

Figure 2:
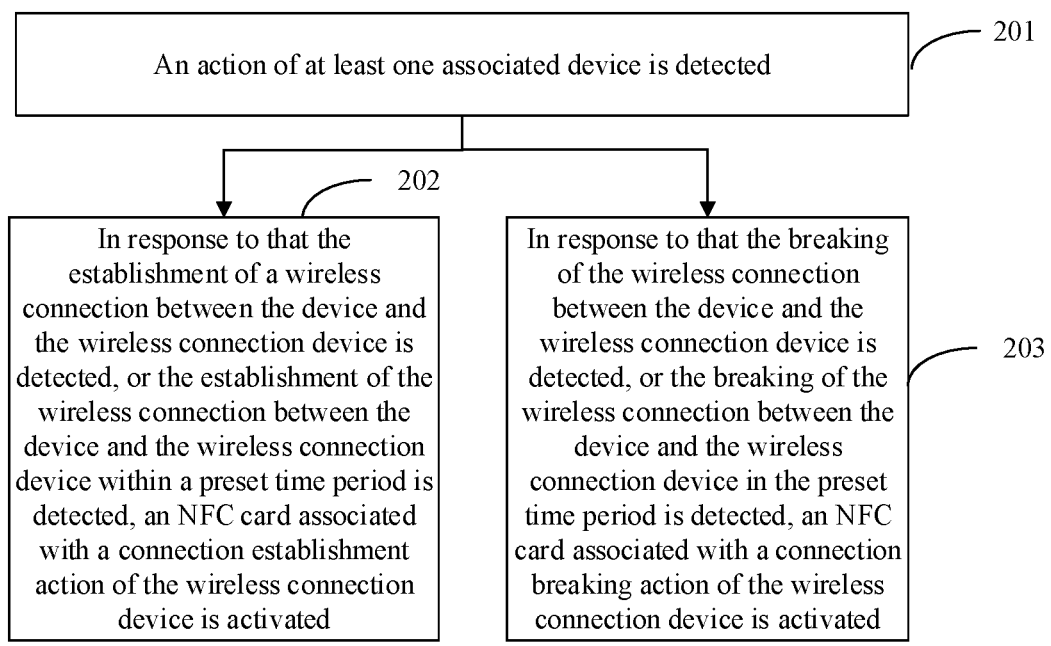
FIG. 2 is a flowchart illustrating a method for activating an NFC card according to some embodiments.

Some embodiments of the present disclosure further provide a method for activating an NFC card. In the embodiment, the associated device may be a wireless connection device. As shown in FIG. 2, the process of switching among a plurality of NFC cards stored in a terminal device through a method may include the following operations.

In operation 201, an action of at least one associated device is detected.

In the embodiment, a plurality of associated devices may be configured for a terminal device. Since one NFC card may correspond to a plurality of application scenarios, each NFC card may be associated with an action of at least one associated device, and may be associated with either actions of a plurality of different associated devices and may also be associated with different actions of the same associated device.

An action of an associated device may contain an action condition and a time condition. The time condition may indicate a specific time period, and upon that an action meeting the action condition occurs in the time period, it can be determined that the action of the associated device occurs.

In the embodiments of the present disclosure, the associated device may be a wireless connection device, for example, a wireless access device, including a wireless router, a wireless access point, etc.

Taking that the associated device is a wireless connection device for example. With the development of smart home technology, life is getting smarter. At a position where there is a wireless connection device (particularly the wireless connection device that a user successfully accessed before), when the user enters a signal coverage of the wireless connection device, automatic connection can be performed in the absence of user awareness; or when the user leaves the signal coverage of the wireless connection device, automatic disconnection can be performed in the absence of user awareness. In an intelligent application scenario, an action of the user can be determined based on connection and disconnection between a user terminal and the wireless connection device at a preset position, namely, the user arrives at the preset position or leaves the preset position.

Then, the wireless connection device may be detected based on the connection and/or the disconnection between the user terminal and the wireless connection device.

Furthermore, the detection may be started according to a user instruction, or may be automatically started according to an activity characteristic of the user or the time condition. The activity characteristic of the user may be a distance of plane movement (e.g. a plane distance of continuous movement is more than 100 m, or the user keeps walking 100 steps and the plane distance of movement is more than 50 m). The time condition may be a certain or a few time points, or a period of time, or an acquisition cycle, or a combination of the above time conditions.

In operation 202, in response to that the establishment of a wireless connection between the device and the wireless connection device is detected, or the establishment of the wireless connection between the device and the wireless connection device within a preset time period is detected, an NFC card associated with a connection establishment action of the wireless connection device is activated.

In the operation, in the case where the associated device is a wireless connection device, in response to that the establishment of the wireless connection between the local device and the wireless connection device is detected, an NFC card used in the application scenario where the wireless connection device exists can be activated. That is, "the user terminal (namely the local device) accesses to the wireless connection device" can be taken as an action of the associated device, and when the action occurs, the associated NFC card can be activated.

Taking that a user goes home for example. It is assumed that the user has a wireless network at home, a wireless router or a wireless access point at home may be set as the associated device, and a user terminal may detect an action of the associated device; when the user is going home, if the user has not yet arrived home but enters the coverage of the home wireless network, the terminal device used by the user can automatically access to the home wireless network, that is, the action of the associated device "the device is connected to the wireless connection device" may occur, and then activation of an NFC card associated with the action can be triggered. The wireless connection device at home can be what the user connects to, and the NFC card associated with the action can be the NFC card for entering the house, so that the activation of the NFC card for the door can be triggered. When coming to the door, the user may directly swipe the local device (the user terminal). An example that the user goes to the company is similar, which will not be repeated here.

Or, to make the activated NFC card correspond to the application scenario more accurately, the time condition may be added, that is, the NFC card associated with the connection establishment action of the wireless connection device may be activated in response to that the establishment of the wireless connection between the device and the wireless connection device within a preset time period is detected. Continuing with the above example, the user may go home at noon and night, and then it may be set that if the establishment of the wireless connection between the user terminal and the wireless connection device is detected between 11 a.m. and 12:00 a.m. and between 7 p.m. and 8 p.m., the corresponding associated NFC card may be activated.

In operation 203, in response to that the breaking of the wireless connection between the device and the wireless connection device is detected, or the breaking of the wireless connection between the device and the wireless connection device in the preset time period is detected, an NFC card associated with a connection breaking action of the wireless connection device is activated.

In the operation, in the case where the associated device is a wireless connection device, in response to that the breaking of the wireless connection between the local device and the wireless connection device is detected, the NFC card used corresponding to the next application scenario of the application scenario of the wireless connection device may be activated. That is, "the user terminal (namely the local device) disconnects from the wireless connection device" is taken as an action of the associated device, and when the action occurs, the NFC card associated with the action can be activated.

Taking that the user leaves company for example It is assumed that the user's company has a wireless network, the company's wireless router or the wireless access point may be set as the associated device, and the user terminal may detect an action of the associated device; when the user leaves the company, if the user has not yet reached a subway station but is out of the coverage of the company's wireless network, the terminal device used by the user can automatically disconnect from the company's wireless network, namely the action of the associated device "the device disconnects from the wireless connection device" occurs, and then the activation of the NFC card associated with the disconnecting action of the associated device (the company's wireless routing device or the wireless access point device) can be triggered, namely the NFC card used in the next application scenario (e.g. the subway station) different from the application scenario (the company) where the associated device was. It can be seen that the NFC card used in the subway station can be activated before the user arrives at the subway station, and then the user can directly swipe the card at a gate machine of the subway station. An example that the user leaves home is similar, which will not be repeated here.

Or, to make the activated NFC card correspond to the application scenario more accurately, the time condition may be added, that is, the NFC card associated with the connection breaking action of the wireless connection device can be activated in response to that the breaking of the wireless connection between the device and the wireless connection device within a preset time period is detected. Continuing with the above example, the user may leave the company at noon and night, then it may be set that if the breaking of the wireless connection between the user terminal and the wireless connection device is detected between 11 a.m. and 12:00 a.m. and between 7 p.m. and 8 p.m., the corresponding associated NFC card can be activated.

In addition, the power of the existing router and other access point devices can be higher, and the coverage can be increased correspondingly. Therefore, when the user is close to but not yet at home, the terminal device used by the user probably can access to the Wi-Fi network at home, which can further provide sufficient time for activation of an NFC card, and improve the accuracy of switching.

Figure 3:
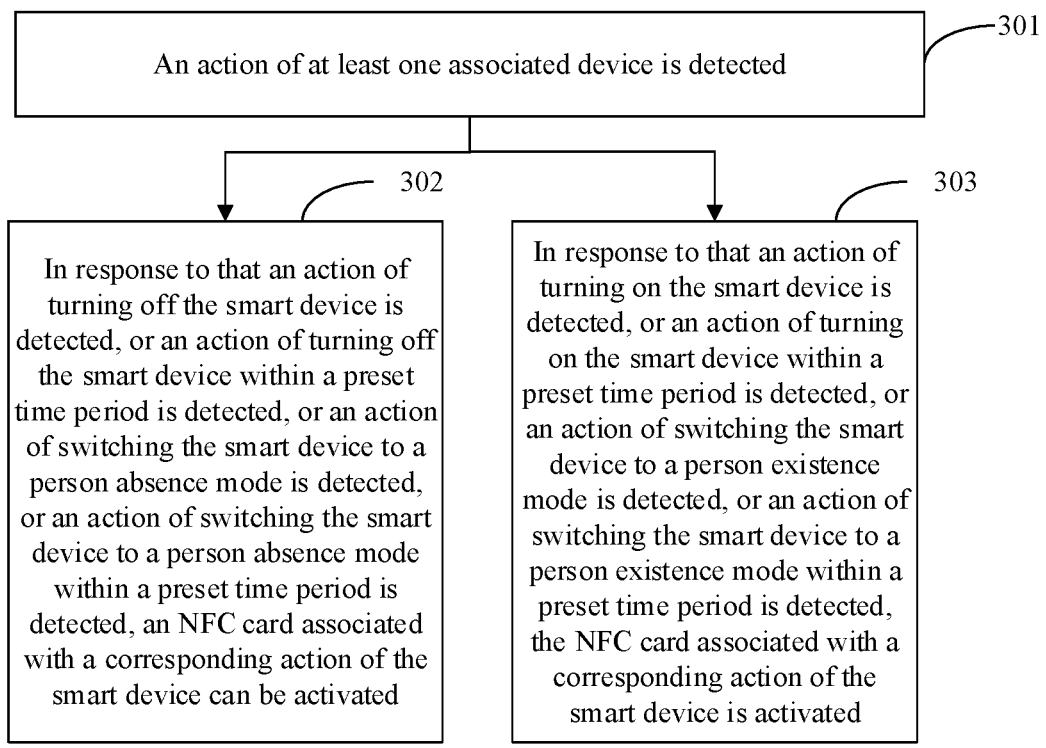
FIG. 3 is a flowchart illustrating a method for activating an NFC card according to some embodiments.

Some embodiments of the present disclosure further provide a method for activating an NFC card. In the embodiment, the associated device may be a smart device. As shown in FIG. 3, the process of switching among a plurality of NFC cards stored in a terminal device through the method may include the following operations.

In operation 301, an action of at least one associated device is detected.

In the embodiment, the associated device may be a smart device. The smart device may be an electronic device, which is usually connected to other devices or networks through different wireless protocols, such as Bluetooth, Zigbee, NFC, Wi-Fi, LiFi, and 4G, and it may be operated interactively and independently to some extent. The smart devices may include: a smart television, an intelligent refrigerator, an air purifier, an intelligent air conditioner, a smart lamp, smart windows and doors, an intelligent curtain, a smart switch, a smart terminal board, an intelligent sweeping machine, a smart robot, a tablet PC, and so on. The local device (e.g. a wearable device) and the smart device may be controlled and managed through an IoT platform. An action of the smart device may be set and monitored through the IoT platform. As a triggering condition, when a default action occurs, the local device may be notified to trigger activation of an NFC card. The local device and the smart device may also be uniformly managed by a management device, for example, a routing device and any smart device; or the local device may serve as a management device, and the management device may monitor an action of the smart device; when a default action occurs, the local device may be notified to trigger a corresponding NFC card.

In operation 302, in response to that an action of turning off the smart device is detected, or an action of turning off the smart device within a preset time period is detected, or an action of switching the smart device to a person absence mode is detected, or an action of switching the smart device to a person absence mode within a preset time period is detected, an NFC card associated with a corresponding action of the smart device can be activated.

In the operation, a triggering action of the smart device may include a turning-off action, or a turning-off action within a preset time period, or switching action to a person absence mode, or a switching action within a preset time period to a person absence mode. In daily life, when switching from one place to another place, a user may perform some operations on devices in the former place; for example, the user may turn off some devices, or set some devices to a person absence mode (some devices may not need to be turned off directly when nobody is around, but set to an operating mode); for example, the user may turn off lights, turn off an air conditioner, close doors and windows, turn on a heat, turn off a speaker, adjust an air purifier to a person absence mode (namely the mode that the filtering power is reduced when nobody is around), adjust the heat to the person absence mode (namely the mode that the heating temperature when nobody is around is set to be lower than that when someone is around), and so on. For the smart device, as the associated device, the change of its operating mode may trigger it to activate an NFC card which is set in the local device and corresponds to the change of the corresponding operating mode.

In addition, the time condition may be set, and it may be considered that not all the preset state-switching actions of the associated device occurring in every time periods may trigger the switching of NFC cards. The turning-off action or the person absence mode switching action occurring in the preset time period may be taken as the condition of triggering the switching between corresponding NFC cards.

Taking that a user leaves home for example. It is assumed that there is an intelligent air conditioner at user's home, which may be set as the associated device, and the user terminal may detect the action of the associated device. If the user turns off the air conditioner when going out, the action of the associated device "turning off the smart device is detected" may occur, accordingly, the activation of an NFC card associated with the action can be triggered, for example, a bus card may be activated. Furthermore, the time condition may be added. For example, if the user turns off the air conditioner when going out between 7 a.m. and 9 a.m., the action of the associated device "turning off the smart device within a preset time period is detected" may occur, accordingly, the activation of an NFC card associated with the action can be triggered, for example, a bus card may be activated. The bus card can be activated after the user leaves home, and then the user may directly swipe the card when taking public transport without manual selection and switch.

Taking that a user leaves home for example. It is assumed that an intelligent lock is set for a door of the user's house, which may be set as the associated device, and the user terminal may detect an action of the associated device. If the user locks the door when going out, the action of the associated device "an action of switching the smart device to a person absence mode is detected" occurs, accordingly, the activation of an NFC card associated with the action can be triggered, for example, a bus card may be activated. Furthermore, the time condition may be added. For example, if the user locks the intelligent lock when going out between 7 a.m. and 9 a.m., the action of the associated device "an action of switching the smart device to a person absence mode within a preset time period is detected" may occurs, accordingly, the activation of the NFC card associated with the action can be triggered, for example, a bus card may be activated. The bus card can be activated after the user leaves home, and then the user may directly swipe the card when taking public transport without manual selection and switch.

In operation 303, in response to that an action of turning on the smart device is detected, or an action of turning on the smart device within a preset time period is detected, or an action of switching the smart device to a person existence mode is detected, or an action of switching the smart device to a person existence mode within a preset time period is detected, the NFC card associated with a corresponding action of the smart device is activated.

Similarly, a user, after moving from one place to another place, usually performs some operations on the devices in the later place. For example, the user may turn on some devices, or set some devices to person existence modes (some devices may be not turned off when nobody is around, but just run in a person absence mode; when someone is around, these devices may not need to be turned on, but adjusted to an operating mode when someone is around), such as, turning on lights, turning on a air conditioner, opening doors and windows, turning on a heat, turning on a speaker, adjusting an air purifier to a person existence mode (namely the mode that the filtering power is increased when someone is around), adjusting the heat to a person existence mode (namely the mode that the heating temperature when someone is around is higher than that when nobody is around), and so on. For the smart devices, as the associated devices, the changes of their operating modes may trigger them to activate the NFC cards which are set in the local device and correspond to the changes of the corresponding operating modes. The time condition may also be set, which will not be repeated here.

Taking that a user goes home for example. It is assumed that there is an intelligent air conditioner at user's home, which may be set as an associated device, and a user terminal may detect an action of the associated device. If the user turns on the air conditioner remotely when the user is about to get home, that is, an action of the associated device "an action of turning on the smart device is detected" occurs, then activation of an NFC card associated with this action is triggered, for example, a door card is activated. Furthermore, a time condition may be added. For example, if the user turns on the air conditioner remotely during 6 p.m. to 8 p.m., i.e., the action of the associated device "an action of turning on the smart device within a preset time period is detected" occurs, then the activation of the NFC card associated with the action is triggered, for example, the door card is activated. Upon the user arrives home, the door card is activated and applied to unlock the door without manual selection and switching.

In another example, there is an intelligent fresh air ventilator at home, which acts as an associated device. When a user is about to get home, the intelligent fresh air ventilator may be automatically adjusted from a person absence mode to a person existence mode in advance, namely, to an operating mode with a higher ventilation power. The action triggers switching to and activation of an NFC card associated with the action, namely, switching to an NFC card of the user's home and activating the NFC card, and then the user may directly use the NFC card to get in the house without manual selection and switching. Furthermore, a time condition may be added. For example, only the action of switching the intelligent fresh air ventilator to the person existence mode during 6 p.m. to 8 p.m. can trigger the switching to and activation of the NFC card of the user's home.

In addition, there may be multiple ways for triggering a smart device to be turned on, turned off, switched to a person existence mode, and switched to a person absence mode. For example, a user may set time, and when the time comes, a smart device may automatically turn on, or turns off, or switches its operating mode. Or, upon other devices automatically identify that the user comes or leaves, a smart device may be triggered to automatically turn on, or turn off, or switch its operating mode; for example, upon capturing the coming or leaving of a user, a camera at a gate of a community may send a notice to a smart device at home to trigger the smart device to perform corresponding operations. The present application does not limit the triggering mode.

A triggering operation generally refers to transmitting instructions of switching to an NFC card and an ID parameter of the NFC card to an NFC chip, and setting the NFC card to a reader state, preferably, setting other NFC cards to a non-reader state. The NFC card set as the reader state may output corresponding information when getting close to a reading device.

Furthermore, before an action of an associated device is detected, an association relationship may be established in advance between the action of the associated device and an NFC card. The establishment of the association relationship may be started according to needs. Maintaining the association relationship, set on a terminal device, between the action of the associated device and the NFC card (e.g. adding a new action of the associated device/an NFC card, deleting the established association relationship, and modifying the established association relationship) does not have a strict sequential relationship with subsequent operations.

The association relationship may be established according to a setting instruction set by a user. The association relationship may also be automatically generated by a system by analyzing historical data generated when a user uses an associated device. The two cases are respectively explained below.

Figure 4:
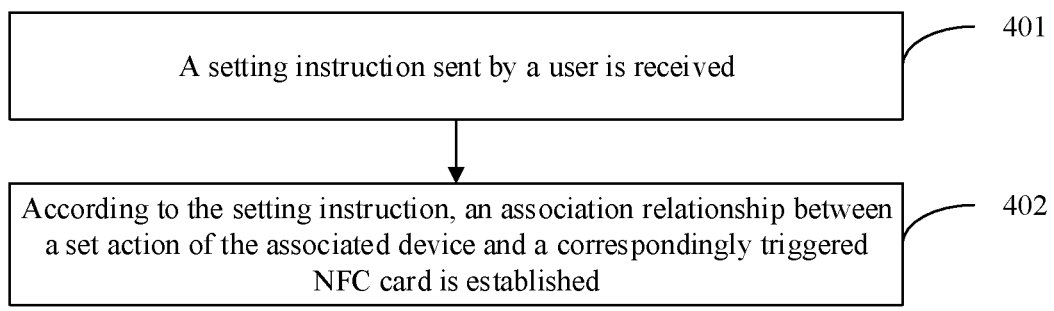
FIG. 4 is a flowchart illustrating a method for activating an NFC card according to some embodiments.

As shown in FIG. 4, establishment association according to a setting instruction sent by a user may include the following operations.

In operation 401, a setting instruction sent by a user is received.

In the operation, a user may input the setting instruction in the form of text or voice by operating an input device of the local device; the input device may be, for example, a keyboard, a touch screen, and a microphone. The setting instruction may indicate a set action of the associated device and a correspondingly triggered NFC card when the set action of the associated device occurs.

In operation 402, according to the setting instruction, an association relationship between a set action of the associated device and a correspondingly triggered NFC card is established.

In the operation, according to the setting instruction, an association relationship between a set action of the associated device and a correspondingly triggered NFC card may be established and stored for matching and activating an NFC card upon that the set action of the association relationship is detected.

The association relationship between an associated device as well as its default action and an associated NFC card may be set in advance, for example, the action of establishing a connection with a wireless connection device at home may be associated with an NFC card of home, the action of breaking the connection with the wireless connection device at home may be associated with an NFC card of a subway station, the action of establishing a connection with a wireless connection device in a company may be associated with an NFC card of the company, and the action of breaking the connection with the wireless connection device in the company may be associated with the NFC card of the subway station.

Figure 5:
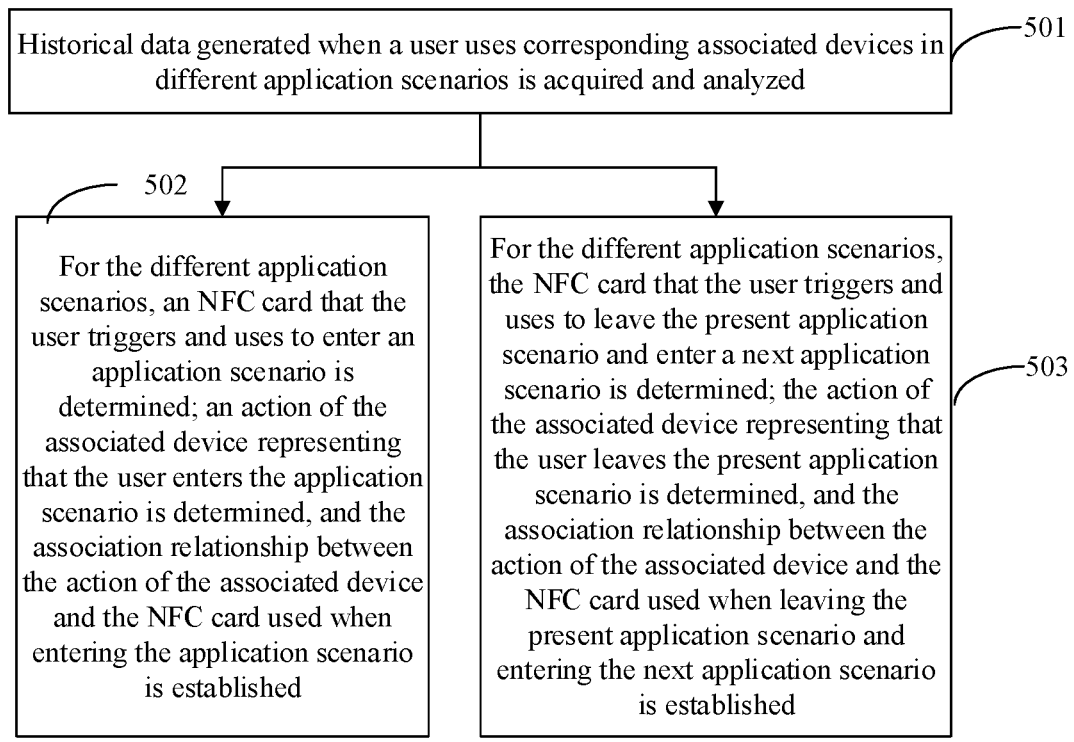
FIG. 5 is a flowchart illustrating a method for activating an NFC card according to some embodiments.

As shown in FIG. 5, the case that an association relationship between an action of the associated device and an NFC card is automatically generated by the system by analyzing historical data generated when a user uses a corresponding associated device may include the following operations.

In operation 501, historical data generated when a user uses corresponding associated devices in different application scenarios is acquired and analyzed.

In the operation, the historical data may be acquired from a record of the local device or from a gateway.

After the historical data is acquired, operation 502 or operation 503 may be executed to analyze and generate the association relationship.

In operation 502, for the different application scenarios, an NFC card that the user triggers and uses to enter an application scenario is determined; an action of the associated device representing that the user enters the application scenario is determined, and the association relationship between the action of the associated device and the NFC card used when entering the application scenario is established.

For example, a terminal carried by a user establishes a wireless connection with a router at home at about 8 p.m. every day, and the user uses an NFC card of home to open the door in the next five minutes, in such a case, "connecting to a wireless routing device at 8 p.m." is an action of the associated device, and an association relationship can be established between the action of the associated device and the NFC card of home. Next, the NFC card of home may be automatically activated according to the association relationship after the user establishes the connection with the wireless routing device at home at night.

In operation 503, for the different application scenarios, the NFC card that the user triggers and uses to leave the present application scenario and enter a next application scenario is determined; the action of the associated device representing that the user leaves the present application scenario is determined, and the association relationship between the action of the associated device and the NFC card used when leaving the present application scenario and entering the next application scenario is established.

For example, after locking the door at about 8 a.m., the user may manually switch to a bus card in 20 minutes. The event "the electronic lock is locked at 8 a.m." indicates the application scenario that the user leaves home and is about to take the public transport, then "the electronic lock is locked at 8 a.m." can represent the action that the associated device leaves the application scenario, and the association relationship can be established between the associated device and the bus card. In this way, the bus card can be automatically activated according to the association relationship after the user locks the door in the morning.

By analyzing the historical data, a rule of using an NFC card is formed. Thus, an associated device and an action of the associated device can be determined, and an association relationship between the action of the associated device and an NFC card can be set.

Figure 6:
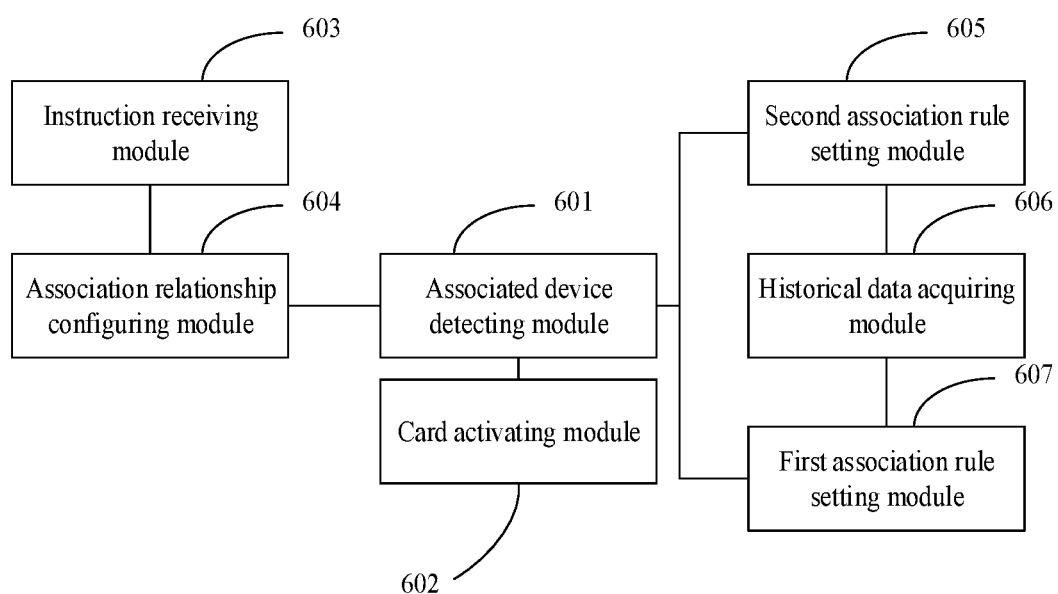
FIG. 6 is a block diagram of a device for activating an NFC card according to some embodiments.

Some embodiments of the present disclosure further provide a device for activating an NFC card. As shown in FIG. 6, the device in terms of structure may include:

an associated device detecting module 601, configured to detect an action of at least one associated device; and a card activating module 602, configured to activate, in response to that a default action of the at least one associated device is detected, an NFC card associated with the default action of the at least one associated device in a local device.

Figure 7:
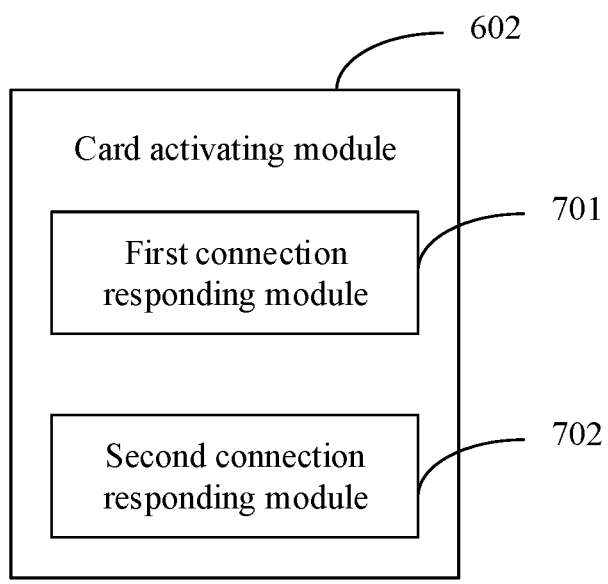
FIG. 7 is a block diagram of a card activating module 602 according to some embodiments.

In some embodiments, the at least one associated device may be wireless connection device. As shown in FIG. 7, the structure of the card activating module 602 may include:

a first connection responding module 701, configured to, in response to that establishment of a wireless connection between the device and a wireless connection device is detected, or establishment of a wireless connection between the device and a wireless connection device within a preset time period is detected, activate an NFC card associated with a connection establishment action of the wireless connection device; and a second connection responding module 702, configured to, in response to that breaking of the wireless connection between the device and the wireless connection device is detected, or breaking of the wireless connection between the device and the wireless connection device in a preset time period is detected, activate an NFC card associated with a connection breaking action of the wireless connection device.

Figure 8:
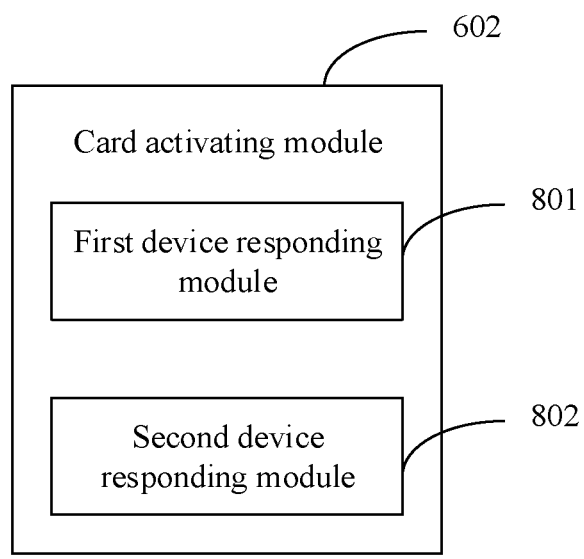
FIG. 8 is a block diagram of a card activating module 602 according to some embodiments.

In some embodiments, the at least one associated device may be a smart device. As shown in FIG. 8, the structure of the card activating module 602 may include:

a first device responding module 801, configured to, in response to that an action of turning off the smart device is detected, or an action of turning off the smart device within a preset time period is detected, or an action of switching the smart device to a person absence mode is detected, or an action of switching the smart device to a person absence mode within a preset time period is detected, activate an NFC card associated with a corresponding action of the smart device; and a second device responding module 802, configured to, in response to that an action of turning on the smart device is detected, or an action of turning on the smart device within a preset time period is detected, or an action of switching the smart device to a person existence mode is detected, or an action of switching the smart device to a person existence mode within a preset time period is detected, activate an NFC card associated with a corresponding action of the smart device.

In some embodiments, the device may further include:

an instruction receiving module 603, configured to receive a setting instruction from a user, the setting instruction indicating a set action of an associated device among the at least one associated device and a triggered NFC card when the set action of the associated device occurs; and an association relationship configuring module 604, configured to establish an association relationship between the set action of the associated device and the triggered NFC card according to the setting instruction.

In some embodiments, the device may further include:

a historical data acquiring module 605, configured to acquire and analyze historical data generated when a user uses the at least one associated device in different application scenarios;

a first association rule setting module 606, configured to, for the different application scenarios, determine an NFC card that the user triggers and uses when entering an application scenario, determine an action of an associated device, among the at least one associated device, for representing that the user enters the application scenario, and establish an association relationship between the action of the associated device and the NFC card used when entering the application scenario; and a second association rule setting module 607, configured to, for the different application scenarios, determine an NFC card that the user triggers and uses to leave a present application scenario and enter a next application scenario, determine an action of an associated device, among the at least one associated device, for representing that the user leaves the present application scenario, and establish an association relationship between the action of the associated device and the NFC card used when leaving the present application scenario and entering the next application scenario.

Some embodiments of the present disclosure further provide a computer device, which includes:

a processor; and a memory configured to store instructions executable for the processor, wherein the processor is configured to:

detect an action of at least one associated device; and in response to that a default action of the at least one associated device is detected, activate an NFC card disposed in a device and associated with the default action of the at least one associated device in the local device.

Figure 9:
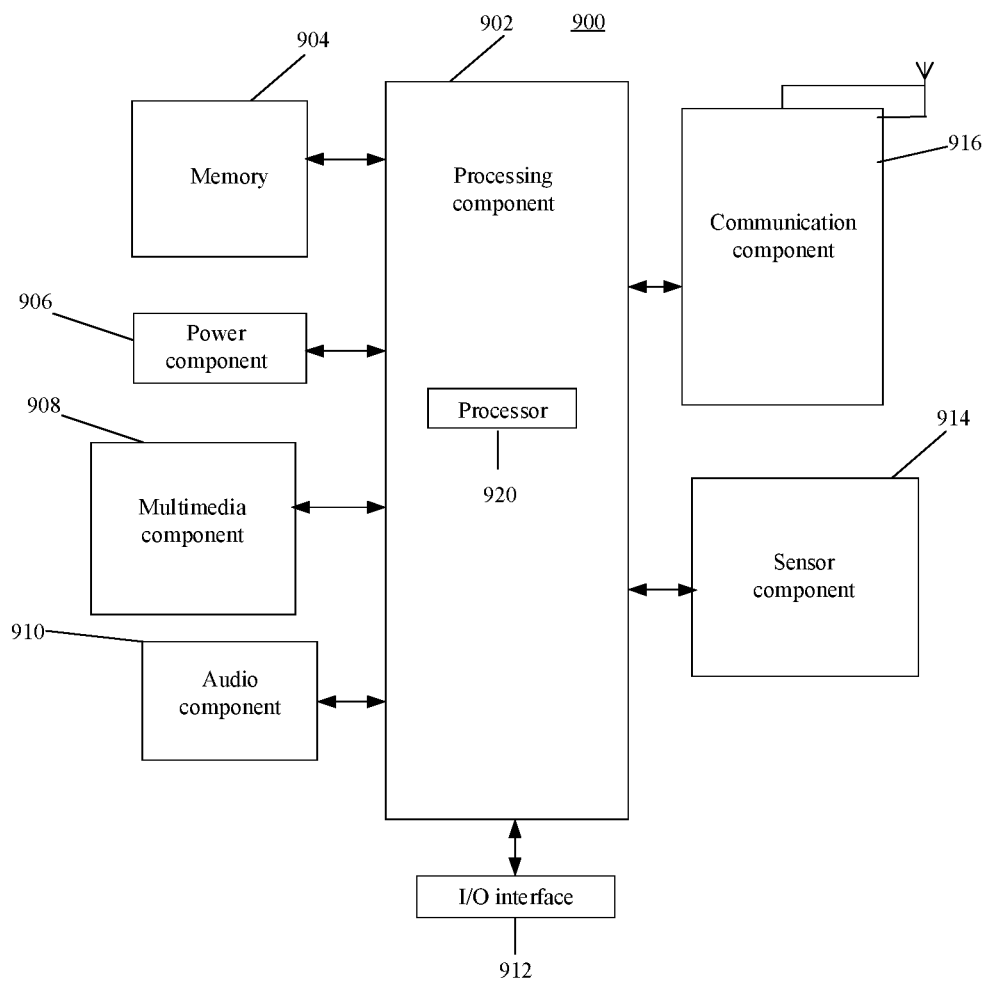
FIG. 9 is a block diagram of a device (a general structure of a mobile terminal) according to some embodiments.

FIG. 9 is a block diagram of a device 900 for activating an NFC card according to some embodiments. For example, the device 900 may be a mobile phone, a computer, a digital broadcast terminal, a messaging device, a gaming console, a tablet, a medical device, exercise equipment and a personal digital assistant.

Referring to FIG. 9, the device 900 may include one or more of the following components: a processing component 902, a memory 904, a power component 906, a multimedia component 908, an audio component 910, an Input/Output (I/O) interface 912, a sensor component 914, and a communication component 916.

The processing component 902 is typically configured to control overall operations of the device 900, such as the operations associated with display, telephone calls, data communications, camera operations, and recording operations. The processing component 902 may include one or more processors 920 to execute instructions to perform all or part of the operations in the above method. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the device 900. Examples of such data may include instructions for any application programs or methods operated on the device 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 is configured to provide power for various components of the device 900. The power component 906 may include a power management system, one or more power supplies, and other components associated with generation, management and distribution of power for the device 900.

The multimedia component 908 may include a screen for providing an output interface between the device 900 and a user. In some embodiments, the screen may include a Liquid Crystal Display (LCD) and a Touch Panel (TP). In some embodiments, an organic light-emitting diode (OLED) display or other types of displays can be employed.

If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 908 includes a front camera and/or a rear camera. The front camera and/or the rear camera may receive external multimedia data when the device 900 is in an operation mode, such as a photographing mode or a video mode. Each of the front camera and the rear camera may be a fixed optical lens system or have focusing and optical zooming capabilities.

The audio component 910 is configured to output and/or input an audio signal. For example, the audio component 910 includes a Microphone (MIC), and the MIC is configured to receive an external audio signal when the device 900 is in the operation mode, such as a call mode, a recording mode and a voice recognition mode. The received audio signal may further be stored in the memory 904 or sent through the communication component 916. In some embodiments, the audio component 910 may further include a speaker configured to output the audio signal.

The I/O interface 912 is configured to provide an interface between the processing component 902 and a peripheral interface module, and the peripheral interface module may be a keyboard, a click wheel, a button and the like. The button may include, but not limited to: a home button, a volume button, a starting button and a locking button.

The sensor component 914 may include one or more sensors configured to provide status assessment in various aspects for the device 900. For instance, the sensor component 914 may detect an on/off status of the device 900 and relative positioning of components, such as a display and small keyboard of the device 900, and the sensor component 914 may further detect a change in a position of the device 900 or a component of the device 900, presence or absence of contact between the user and the device 900, orientation or acceleration/deceleration of the device 900 and a change in temperature of the device 900. The sensor component 914 may include a proximity sensor configured to detect presence of an object nearby without any physical contact.

The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and another device. The device 900 may access a communication-standard-based wireless network, such as a Wi-Fi network, a 2G, 3G, 4G, or 5G network or a combination thereof. In some embodiments, the communication component 916 receives a broadcast signal or broadcast associated information from an external broadcast management system through a broadcast channel. In some embodiments, the communication component 916 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In some embodiments, the device 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In some embodiments, there is also provided a non-transitory computer-readable storage medium including instructions, such as the memory 904 including instructions, and the instructions may be executed by the processor 920 of the device 900 to implement the abovementioned method. For example, the non-transitory computer-readable storage medium may be a Read-Only Memory (ROM), a Random-Access Memory (RAM), a Compact Disc Read-Only Memory (CD-ROM), a magnetic tape, a floppy disc, an optical data storage device and the like.

A non-transitory computer-readable storage medium is provided. When instructions in the storage medium is executed by a processor of a mobile terminal, the mobile terminal can perform the method for activating an NFC card. The method may include that:
an action of at least one associated device is detected; and
in response to that a default action of the at least one associated device is detected, an NFC card associated with the default action of the at least one associated device in a local device is activated.

The embodiments of the present disclosure provide a method and device for activating an NFC card. An action of at least one associated device can be detected, and in response to that a default action of the at least one associated device is detected, an NFC card associated with the default action of the at least one associated device in a local device can be activated, automatic selection and activation of the NFC card can thus be completed. The low efficiency in management of switching a simulation card and poor user experience can be improved. When network and positioning signals are good, automatic activation can be completed in advance without manually performing any operation, thereby improving operation efficiency.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for activating a Near Field Communication (NFC) card, comprising:
    detecting an action of at least one associated device; and
    in response to that a default action of the at least one associated device is detected, activating an NFC card disposed in a device and associated with the default action of the at least one associated device, wherein when the at least one associated device is a wireless connection device;
in response to that the default action of the at least one associated device is detected, activating the NFC card disposed in a device and associated with the default action of the at least one associated device comprises:
in response to that establishment of a wireless connection between the device and a wireless connection device is detected, or establishment of a wireless connection between the device and a wireless connection device within a preset time period is detected, activating an NFC card associated with a connection establishment action of the wireless connection device; and
in response to that breaking of the wireless connection between the device and the wireless connection device is detected, or breaking of the wireless connection between the device and the wireless connection device in a preset time period is detected, activating an NFC card associated with a connection breaking action of the wireless connection device;
or,
wherein when the at least one associated device is a smart device;
in response to that the default action of the at least one associated device is detected, activating the NFC card disposed in a device and associated with the default action of the at least one associated device comprises:
in response to that an action of turning off the smart device is detected, or an action of turning off the smart device within a preset time period is detected, or an action of switching the smart device to a person absence mode is detected, or an action of switching the smart device to a person absence mode within a preset time period is detected, activating an NFC card associated with a corresponding action of the smart device; and
in response to that an action of turning on the smart device is detected, or an action of turning on the smart device within a preset time period is detected, or an action of switching the smart device to a person existence mode is detected, or an action of switching the smart device to a person existence mode within a preset time period is detected, activating an NFC card associated with a corresponding action of the smart device.

2. The method for activating an NFC card according to claim 1, wherein the at least one associated device is the wireless connection device, the method further comprising:
receiving a setting instruction from a user, the setting instruction indicating a set action of an associated device among the at least one associated device and a triggered NFC card when the set action of the associated device occurs; and
according to the setting instruction, establishing an association relationship between the set action of the associated device and the triggered NFC card.

3. The method for activating an NFC card according to claim 1, wherein the at least one associated device is the wireless connection device, the method further comprising:
acquiring and analyzing historical data generated when a user uses the at least one associated device in different application scenarios;
for the different application scenarios, determining an NFC card that the user triggers and uses when entering an application scenario, determining an action of an associated device, among the at least one associated device, for representing that the user enters the application scenario, and establishing an association relationship between the action of the associated device and the NFC card used when entering the application scenario; and/or
for the different application scenarios, determining an NFC card that the user triggers and uses to leave a present application scenario and enter a next application scenario, determining an action of an associated device, among the at least one associated device, for representing that the user leaves the present application scenario, and establishing an association relationship between the action of the associated device and the NFC card used when leaving the present application scenario and entering the next application scenario.

4. A device for activating a Near Field Communication (NFC) card, comprising: a processing component and a communication component configured to be controlled by the processing component to transmit and receive information, wherein the processing component is configured to:
detect an action of at least one associated device; and
activate, in response to that a default action of the at least one associated device is detected, an NFC card disposed in a device and associated with the default action of the at least one associated device,
wherein the at least one associated device is a wireless connection device; the processing component is further configured to:
in response to that establishment of a wireless connection between the device and a wireless connection device is detected, or establishment of a wireless connection between the device and a wireless connection device within a preset time period is detected, activate an NFC card associated with a connection establishment action of the wireless connection device; and
in response to that breaking of the wireless connection between the device and the wireless connection device is detected, or breaking of the wireless connection between the device and the wireless connection device in a preset time period is detected, activate an NFC card associated with a connection breaking action of the wireless connection device;
or,
wherein the at least one associated device is a smart device; the processing component is further configured to:
in response to that an action of turning off the smart device is detected, or an action of turning off the smart device within a preset time period is detected, or an action of switching the smart device to a person absence mode is detected, or an action of switching the smart device to a person absence mode within a preset time period is detected, activate an NFC card associated with a corresponding action of the smart device; and
in response to that an action of turning on the smart device is detected, or an action of turning on the smart device within a preset time period is detected, or an action of switching the smart device to a person existence mode is detected, or an action of switching the smart device to a person existence mode within a preset time period is detected, activate an NFC card associated with a corresponding action of the smart device.

5. The device for activating an NFC card according to claim 4, wherein the at least one associated device is the wireless connection device, and the processing component is further configured to:
  control the communication component to receive a setting instruction from a user, the setting instruction indicating a set action of an associated device among the at least one associated device and a triggered NFC card when the set action of the associated device occurs; and
  establish an association relationship between the set action of the associated device and the triggered NFC card according to the setting instruction.

6. The device for activating an NFC card according to claim 4, wherein when the at least one associated device is the wireless connection device, and the processing component is further configured to:
  control the communication component to acquire and analyze historical data generated when a user uses the at least one associated device in different application scenarios;
  for the different application scenarios, determine an NFC card that the user triggers and uses when entering an application scenario, determine an action of an associated device, among the at least one associated device, for representing that the user enters the application scenario, and establish an association relationship between the action of the associated device and the NFC card used when entering the application scenario;
  for the different application scenarios, determine an NFC card that the user triggers and uses to leave a present application scenario and enter a next application scenario, determine an action of an associated device, among the at least one associated device, for representing that the user leaves the present application scenario, and establish an association relationship between the action of the associated device and the NFC card used when leaving the present application scenario and entering the next application scenario.

7. A terminal, comprising:
  a processor; and
  a memory configured to store instructions executable for the processor,
  wherein the processor is configured to:
    detect an action of at least one associated device; and
    in response to that a default action of the at least one associated device is detected, activate an NFC card disposed in a device and associated with the default action of the at least one associated device,
  wherein when the at least one associated device is a wireless connection device; the processor is further configured to:
    in response to that establishment of a wireless connection between the device and a wireless connection device is detected, or establishment of a wireless connection between the device and a wireless connection device within a preset time period is detected, activate an NFC card associated with a connection establishment action of the wireless connection device; and
    in response to that breaking of the wireless connection between the device and the wireless connection device is detected, or breaking of the wireless connection between the device and the wireless connection device in a preset time period is detected, activate an NFC card associated with a connection breaking action of the wireless connection device;
  or,
  wherein the at least one associated device is a smart device; the processor is further configured to:
    in response to that an action of turning off the smart device is detected, or an action of turning off the smart device within a preset time period is detected, or an action of switching the smart device to a person absence mode is detected, or an action of switching the smart device to a person absence mode within a preset time period is detected, activate an NFC card associated with a corresponding action of the smart device; and
    in response to that an action of turning on the smart device is detected, or an action of turning on the smart device within a preset time period is detected, or an action of switching the smart device to a person existence mode is detected, or an action of switching the smart device to a person existence mode within a preset time period is detected, activate an NFC card associated with a corresponding action of the smart device.

8. The terminal according to claim 7, wherein the at least one associated device is the wireless connection device, and the processor is further configured to:
  control a communication component to receive a setting instruction from a user, the setting instruction indicating a set action of an associated device among the at least one associated device and a triggered NFC card when the set action of the associated device occurs; and
  establish an association relationship between the set action of the associated device and the triggered NFC card according to the setting instruction.

9. The terminal according to claim 7, wherein the at least one associated device is the wireless connection device, and the processor is further configured to:
  control a communication component to acquire and analyze historical data generated when a user uses the at least one associated device in different application scenarios;
  for the different application scenarios, determine an NFC card that the user triggers and uses when entering an application scenario, determine an action of an associated device, among the at least one associated device, for representing that the user enters the application scenario, and establish an association relationship between the action of the associated device and the NFC card used when entering the application scenario;
  for the different application scenarios, determine an NFC card that the user triggers and uses to leave a present application scenario and enter a next application scenario, determine an action of an associated device, among the at least one associated device, for representing that the user leaves the present application scenario, and establish an association relationship between the action of the associated device and the NFC card used when leaving the present application scenario and entering the next application scenario.

10. A non-transitory computer-readable storage medium having instructions stored thereon for execution by a processor of a mobile terminal to enable the mobile terminal to implement the method of claim 1.

11. The non-transitory computer-readable storage medium according to claim 10, wherein the at least one associated device is a wireless connection device, the instructions are for further execution by the processor to enable the mobile terminal to implement operations of:
  in response to that establishment of a wireless connection between the device and a wireless connection device is detected, or establishment of a wireless connection between the device and a wireless connection device within a preset time period is detected, activating an NFC card associated with a connection establishment action of the wireless connection device; and in response to that breaking of the wireless connection between the device and the wireless connection device is detected, or breaking of the wireless connection between the device and the wireless connection device in a preset time period is detected, activating an NFC card associated with a connection breaking action of the wireless connection device.

12. The non-transitory computer-readable storage medium according to claim 10, wherein the at least one associated device is a smart device; the instructions are for further execution by the processor to enable the mobile terminal to implement operations of:

in response to that an action of turning off the smart device is detected, or an action of turning off the smart device within a preset time period is detected, or an action of switching the smart device to a person absence mode is detected, or an action of switching the smart device to a person absence mode within a preset time period is detected, activating an NFC card associated with a corresponding action of the smart device; and in response to that an action of turning on the smart device is detected, or an action of turning on the smart device within a preset time period is detected, or an action of switching the smart device to a person existence mode is detected, or an action of switching the smart device to a person existence mode within a preset time period is detected, activating an NFC card associated with a corresponding action of the smart device.

13. The non-transitory computer-readable storage medium according to claim 11, wherein the instructions are for further execution by the processor to enable the mobile terminal to implement operations of:

receiving a setting instruction from a user, the setting instruction indicating a set action of an associated device among the at least one associated device and a triggered NFC card when the set action of the associated device occurs;

according to the setting instruction, establishing an association relationship between the set action of the associated device and the triggered NFC card;

acquiring and analyzing historical data generated when a user uses the at least one associated device in different application scenarios;

for the different application scenarios, determining an NFC card that the user triggers and uses when entering an application scenario, determining an action of an associated device, among the at least one associated device, for representing that the user enters the application scenario, and establishing an association relationship between the action of the associated device and the NFC card used when entering the application scenario; and/or for the different application scenarios, determining an NFC card that the user triggers and uses to leave a present application scenario and enter a next application scenario, determining an action of an associated device, among the at least one associated device, for representing that the user leaves the present application scenario, and establishing an association relationship between the action of the associated device and the NFC card used when leaving the present application scenario and entering the next application scenario.

14. A communication system implementing the method according to claim 1, comprising a wireless connection device and a smart device, wherein smart device comprises a plurality of NFC cards, and is configured to automatically activate one or more of the plurality of NFC cards based on association with the default action, without manual selection or switching.

* * * * *